(12) United States Patent
Hyman et al.

(10) Patent No.: US 10,879,953 B1
(45) Date of Patent: Dec. 29, 2020

(54) SYNCHRONOUS MULTICHANNEL FREQUENCY HOPPING OF MODULATED SIGNALS

(71) Applicant: IXI Technology Holdings, Inc., Yorba Linda, CA (US)

(72) Inventors: Daniel Hyman, Long Beach, CA (US); Jeffrey Norris, Lake Forest, CA (US); Michael Dekoker, Huntington Beach, CA (US); Anthony Aquino, Brea, CA (US)

(73) Assignee: IXI Technology Holdings, Inc., Yorba Linda, CA (US)

( * ) Notice: Subject to any disclaimer, the term of this patent is extended or adjusted under 35 U.S.C. 154(b) by 0 days.

(21) Appl. No.: 16/746,959

(22) Filed: Jan. 20, 2020

(51) Int. Cl.
*H04B 1/7136* (2011.01)
(52) U.S. Cl.
CPC ................................ *H04B 1/7136* (2013.01)
(58) Field of Classification Search
CPC ................ H04B 1/7136; H04L 27/152; H04L 2027/0081
See application file for complete search history.

(56) References Cited

U.S. PATENT DOCUMENTS 7,139,545 B2 * 11/2006 Drentea .................... H04B 1/28
455/314

* cited by examiner

*Primary Examiner* — Kevin Kim
(74) *Attorney, Agent, or Firm* — The Watson IP Group, PLC; Jovan N. Jovanovic

(57) ABSTRACT

An apparatus is comprised of a processor, first and second first Phase-Locked Loop Waveform Generators (PLLWGs), first and second Voltage Controlled Oscillators (VCOs), and a Radio Frequency (RF) switch. The processor generates first and second data program signals to program the first PLLWG and the second PLLWG, respectively, and generates a first and second trigger command signals instructing the first and second PLLWGs to generate first and second analog tuning signals, respectively. The first PLLWG, coupled to the processor, generates the first analog tuning signal. The second PLLWG, coupled to the processor, generates the second analog tuning signal. The first VCO, coupled to the first PLLWG, generates a first channel frequency signal. The second VCO, coupled to the second PLLWG, generates a second channel frequency signal. The RF switch selectively outputs one of a first pre-switch frequency signal and a second pre-switch frequency signal.

20 Claims, 3 Drawing Sheets

SYNCHRONOUS MULTICHANNEL FREQUENCY HOPPING OF MODULATED SIGNALS

CROSS-REFERENCE TO RELATED APPLICATION

NA

BACKGROUND OF THE DISCLOSURE

1. Field of the Disclosure

The disclosure relates in general to modulated signals, and more particularly, to synchronous multichannel frequency hopping of modulated signals. Such modulation is not limited to countering drones, however, such modulation is particularly useful for stopping and preventing unwanted drone activity.

2. Background Art

A typical high-data-rate communication system is limited in speed with which it may be reconfigured from one channel with one waveform to another channel of the same or different waveform. Digital modulation techniques can change a modulation technique of a center frequency (e.g., a particular channel) nearly instantaneously (e.g., nanoseconds to tens of nanoseconds), but the change of the center frequency is comparably slow (tens to hundreds of microseconds). Direct digital synthesis techniques can change both center frequency and modulation nearly instantaneously but require a high-speed Digital-to-Analog Converter (DAC) capable of generating the center frequency directly. Such systems have high speed and many options for waveforms and/or modes of operation, but are significantly more expensive and consume greater power than conventional heterodyne architectures.

Typical communication systems, including most military systems, use channel-hopping speeds of tens of μsec to tens of msec. Only very specific communications, communication emulation/disruption, and electronic warfare systems benefit from faster μsec or sub-μsec channel hopping. No commercial Phase-Locked Loop (PLL) controller for any separate or integrated Voltage-Controlled Oscillator (VCO) product or combination of products is fast enough to meet this specific speed.

SUMMARY OF THE DISCLOSURE

The disclosure is directed to an apparatus that is comprised of a processor, first and second Phase-Locked Loop Waveform generators (PLLWGs), first and second Voltage Controlled Oscillators (VCOs), and a Radio Frequency (RF) switch. The processor generates first and second data program signals to program the first PLLWG and the second PLLWG, respectively, and generates a first and second trigger command signals instructing the first and second PLLWGs to generate first and second analog tuning signals, respectively. The first PLLWG, coupled to the processor, generates the first analog tuning signal based on the first data program signals and the first trigger command signal. The second PLLWG, coupled to the processor, generates the second analog tuning signal based on the second data program signals and the second trigger command signal. The first VCO, coupled to the first PLLWG, receives the first analog tuning signal and generates a first channel frequency signal based on the first analog tuning signal. The second VCO, coupled to the second PLLWG, receives the second analog tuning signal and generates a second channel frequency signal based on the second analog tuning signal. The RF switch selectively outputs one of a first pre-switch frequency signal and a second pre-switch frequency signal, the first pre-switch frequency signal and the second pre-switch frequency signal being based on the first analog tuning signal and the second analog tuning signal, respectively.

In some configurations, the apparatus is further comprised of a first Programmable Logic Device (PLD), within the first PLLWG, to close a first feedback loop from the first VCO to the first PLLWG, and a second PLD, within the second PLLWG, to close a second feedback loop from the second VCO to the first PLLWG.

In some configurations, the apparatus further comprises a first filtering circuit coupled to both the first PLLWG and the first VCO and a second filtering circuit coupled to both the second PLLWG and the second VCO. The first and second filtering circuits condition the first and second analog tuning signals, respectively.

In some configurations, the apparatus further comprises a Digital-to-Analog Converter (DAC) and an upconverting QM mixer. The processor further generates a data command which instructs the DAC to generate an in-phase modulation signal and a Quadrature Modulation (QM) signal. The upconverting QM mixer receives the in-phase modulation signal, the QM signal, and one of the first pre-switch frequency signal and the second pre-switch frequency signal, and generates a modulated output signal based on the in-phase modulation signal, the quadrature modulation signal, and one of the first pre-switch frequency signal and the second pre-switch frequency signal.

In some configurations, the apparatus further comprises an in-phase signal filter to condition an in-phase raw data signal from the DAC and generate an in-phase modulator signal and a quadrature signal filter to condition the QM signal and generate the quadrature modulation signal.

In some configurations, the RF switch includes a broadband resistive load coupled to ground.

In some configurations, each of the first and second PLLWGs are Analog Devices ADF4169s.

In some configurations, the processor is one of an Intel Cyclone® 10GX FPGA with 48 Serial General Purpose Input/Output (SGPIO) capable of bit-shifting operation up to 270 Mbps, configurable for up to 24 outputs with data rates of up to 1.4 Gbps, an NXP LPC43S50FET180E microcontroller with 16 SGPIO capable of bit-shifting operation up to 204 Mbps, and System-On-a-Chip (SOC).

In some configurations, the apparatus further comprises first and second RF power splitters generating the first and second pre-switch frequency signals, respectively.

In some configurations, each of the first and second VCOs includes an oscillator element and a VCO amplifier, the oscillator element receiving a control voltage and generating a radio frequency signal of a frequency determined by a voltage level of the control voltage and the VCO amplifier amplifying the radio frequency signal and outputting the amplified channel frequency signal.

The disclosure is also directed to a method that comprises generating, by a processor, first and second data program signals to program a first PLLWG and a second PLLWG, respectively, and generating first and second trigger command signals instructing the first and second PLLWGs to generate first and second analog tuning signals, respectively. The method further includes generating, by the first PLLWG coupled to the processor, the first analog tuning signal based on the first data program signals and the first trigger command signal, and generating, by the second PLLWG coupled to the processor, the second analog tuning signal based on the second data program signals and the second trigger command signal. The method yet further includes receiving, by a VCO coupled to the first PLLWG, the first analog tuning signal and generating a first channel frequency signal based on the first analog tuning signal, and receiving, by a second VCO coupled to the second PLLWG, the second analog tuning signal and generating a second channel frequency signal based on the second analog tuning signal. The method even yet further includes selectively outputting, by an RF switch, one of a first pre-switch frequency signal and a second pre-switch frequency signal, the first pre-switch frequency signal and the second pre-switch frequency signal being based on the first analog tuning signal and the second analog tuning signal, respectively.

In some configurations, the method further comprises closing, by a first Programmable Logic Device (PLD) within the first PLLWG, a first feedback loop from the first VCO to the first PLLWG, and closing, by a second PLD within the second PLLWG, a second feedback loop from the second VCO to the first PLLWG.

In some configurations, the method further comprises conditioning, by first and second filtering circuits, the first and second analog tuning signals, respectively, the first filtering circuit coupled to both the first PLLWG and the first VCO and the second filtering circuit coupled to both the second PLLWG and the second VCO.

In some configurations, the method further comprises generating, by the processor, a data command which instructs a digital-to-analog converter (DAC) to generate an in-phase modulation signal and a QM signal, receiving, by an upconverting QM mixer, the in-phase modulation signal, the QM signal, and one of the first pre-switch frequency signal and the second pre-switch frequency signal, and generating, by the upconverting QM mixer, a modulated output signal based on the in-phase modulation signal, the quadrature modulation signal, and one of the first pre-switch frequency signal and the second pre-switch frequency signal.

In some configurations, the method further comprises conditioning, by an in-phase signal filter, an in-phase raw data signal from the DAC to generate an in-phase modulator signal, and conditioning, by a quadrature signal filter, the QM signal to generate the quadrature modulation signal.

In some configurations, the RF switch of the method includes a broadband resistive load coupled to ground.

In some configurations, each of the first and second PLLWGs of the method are Analog Devices ADF4169s.

In some configurations, the processor of the method is one of an Intel Cyclone® 10GX FPGA with 48 Serial General Purpose Input/Output (SGPIO) capable of bit-shifting operation up to 270 Mbps, configurable for up to 24 outputs with data rates of up to 1.4 Gbps, an NXP LPC43S50FET180E microcontroller with 16 SGPIO capable of bit-shifting operation up to 204 Mbps, and System-On-a-Chip (SOC).

In some configurations, the method further comprises generating, by first and second RF power splitters, the first and second pre-switch frequency signals, respectively.

In some configurations, each of the first and second VCOs includes an oscillator element and a VCO amplifier, and the method further comprises receiving, by the oscillator element, a control voltage, generating, by the oscillator element, a radio frequency signal of a frequency determined by a voltage level of the control voltage, and amplifying, by the VCO amplifier, the radio frequency signal, and outputting, by the VCO amplifier, the amplified channel frequency signal.

BRIEF DESCRIPTION OF THE DRAWINGS

The disclosure will now be described with reference to the drawings wherein.

DETAILED DESCRIPTION OF THE DISCLOSURE

Figure 1:
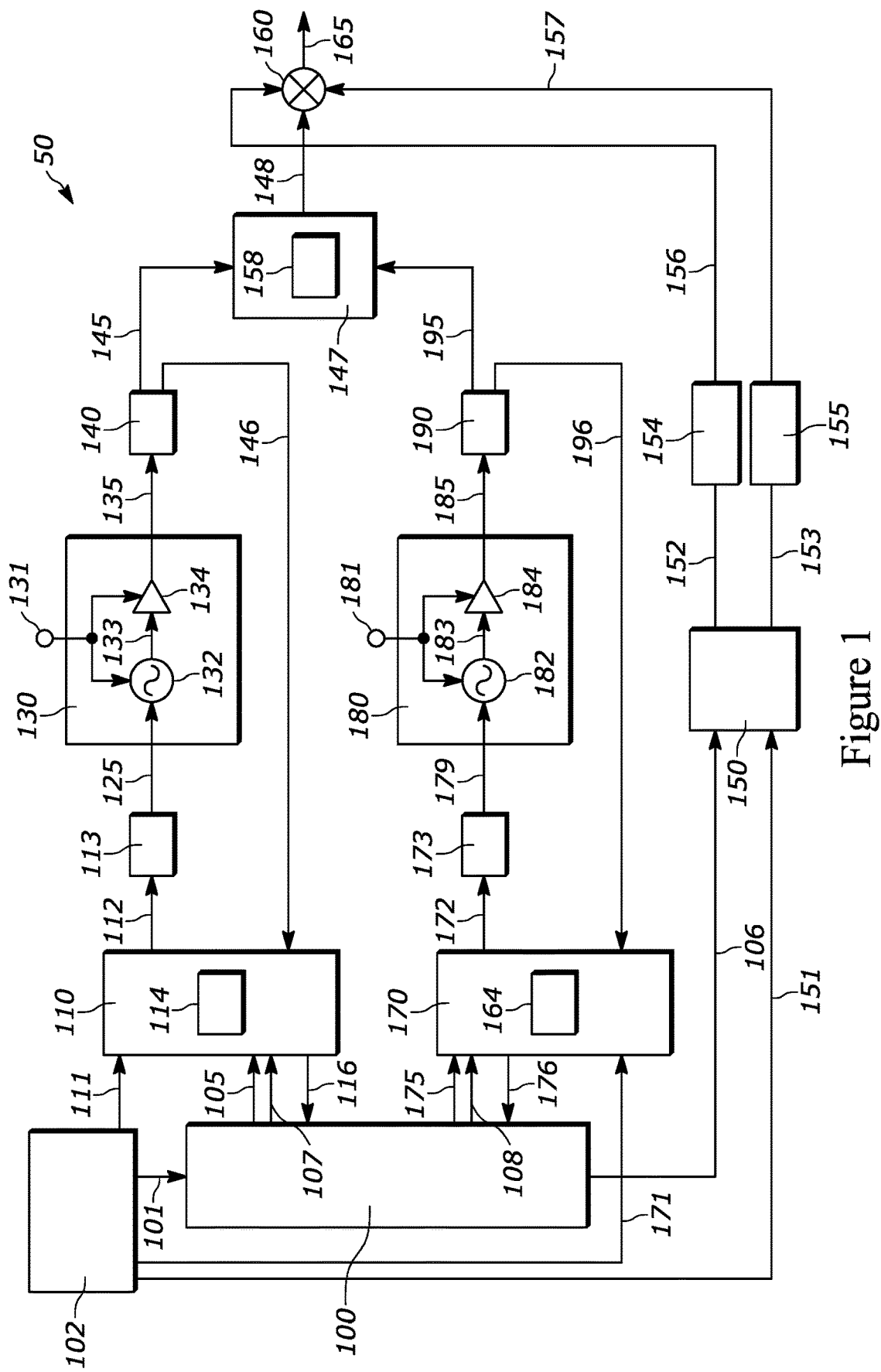
FIG. 1 illustrates an example apparatus to for synchronous multichannel frequency hopping of modulated signals, in accordance with at least one embodiment disclosed herein.

While this disclosure is susceptible of embodiment(s) in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, an embodiment is disclosed that includes an apparatus 50 illustrated as including a plurality of components. The apparatus 50 rapidly changes a low-bandwidth signal (e.g., 20 MHz) across a wide range of frequencies (e.g., many GHz) using a small number of components having lower cost and power consumption than would be required in a typical fully digitally synthesized approach. The apparatus 50 includes processor, such as a MCU 100, that is coupled to a pair of PLLWG, such as a fast-locking first PLLWG 110 and a fast-locking second PLLWG 170, the first and second PLLWGs 110/170 also coupled to a pair of VCOs, such as a first VCO 130 and a second VCO 180, enabling two synchronous multichannel paths to be alternately tuned to lock onto separate output frequencies that can be rapidly selected, such as by an RF switch 147. The MCU 100 is also coupled to a high-speed DAC, such as DAC 150. The apparatus 50 changes channel center frequencies at the speed of the RF switch 147 instead of the speed of frequency locking, subject to the limitation that the time spent on a given frequency from an output of the first VCO 130 is sufficiently long for the second VCO 180 to tune and lock onto a second frequency ready for switching. In at least one embodiment, the apparatus 50 eschews an integrating function of an active filter and a signal conditioner for a PLL feedback function discussed below.

For example, the apparatus 50 includes a clock resource 102 that is coupled to a processor, such as the MCU 100, a waveform generator, such as the first PLLWG 110, the second PLLWG 170, and a DAC, such as the high-speed DAC 150. The clock resource 102 generates at least four timing signals, a first clock signal, such as an MCU clock signal 101, a second clock signal, such as a first PLLWG clock signal 111, a third clock signal, such as a QM clock signal 151, and a fourth clock signal, such as a PLLWG clock signal 171, which are received by the MCU 100, the first PLLWG 110, the high-speed DAC 150, and the second PLLWG 170, respectively. The MCU clock signal 101 functions as a form of clock that ensures timing of processor functions, data, and waveform generator are synchronized to the degree necessary. The MCU 100 generates control commands for the apparatus 50. In at least one embodiment, the MCU 100 is an Intel Cyclone® 10GX FPGA with 48 SGPIO capable of bit-shifting operation up to 270 Mbps and can be configured for up to 24 outputs with data rates of up to 1.4 Gbps. In at least one embodiment, the MCU 100 is an NXP LPC43S50FET180E microcontroller with 16 SGPIO capable of bit-shifting operation up to 204 Mbps. In other alternative embodiment(s), one or more of any number of available microprocessor(s), FPGA(s), or SOC(s) can perform the role of the MCU 100.

The clock resource 102 outputs and the MCU 100 receives, respectively, the MCU clock signal 101. In the example of FIG. 1, the clock resource 102 is comprised of at least three synchronous clock generators (not shown), a first responsible for generating the MCU clock signal 101, the second responsible for generating a QM clock signal 151 for the high-speed DAC 150, and a third responsible for generating the first PLLWG clock signal 111 for the first PLLWG 110 and the second PLLWG clock signal 171 for the second PLLWG 170. In at least one embodiment, these clock generators may be driven by a single master oscillating source (not shown) and buffered and distributed to multiple circuits. In other embodiment(s), the first PLLWG clock signal 111 and second PLLWG clock signal 171 are synchronous to each other but asynchronous to the MCU clock signal 101 and QM clock signal 151. In further other embodiment(s), clock generators (not shown) are buffered and distributed to multiple MCUs, PLLWGs, and/or DACs, so that a small number of master clocks can provide partially, essentially, or absolutely synchronous timing to a plurality of circuits (not shown) in a multi-band system.

The MCU 100 is also coupled to both of the first PLLWG 110 and the second PLLWG 170. The controlling MCU 100 generates control commands using high-speed or GPIO digital signal pins having a moderately low voltage (e.g., 1.8V) representing a logic "high". These pins are capable of being driven with a clock signal, data signal, or encoded digital signal at a rate of speed limited by the characteristics of the controlling MCU 100, the speed of its clock input, and the time constant of the signal line and components. The controlling MCU 100 generates a first trigger signal 105 that is output to and received by the first PLLWG 110, the first trigger signal 105 instructing the first PLLWG 110 to generate a first analog tuning signal 112. Similarly, the controlling MCU 100 also generates a second trigger command signal 175 that is output to and received by the second PLLWG 170, the second trigger command signal 175 instructing the second PLLWG 170 to generate a second analog tuning signal 172. In at least one embodiment, other voltages can be used to represent a logic "high" or logic "low", as well as a voltage range of analog outputs used throughout the apparatus 50 with ranges of voltages and ground references to be encountered in various implementations as disclosed.

The MCU 100 further generates parallel QM data signals 106 and outputs the parallel QM data signals 106 to the high-speed DAC 150 which converts the parallel QM data signals 106 into an in-phase raw data signal 152 and a quadrature raw data signal 153, both of which are output by the DAC 150. The parallel QM data signals 106 contains the amplitude and phase shifted content already in the digital definitions of the data. The differential in-phase and quadrature signals are digitally conditioned prior to their storage in memory accessible by the MCU 100. Such conditioning in the digital domain involves filtering and phase shifting of the quadrature content relative to the in-phase content. In the example of FIG. 1, the MCU 100 is a separate component from the high-speed DAC 150. In at least one embodiment, the MCU 100 incorporates a high-speed DAC as an integrated DAC. In that embodiment(s), the in-phase modulation signal 155 and a quadrature modulation signal 156 are generated inside the MCU 100 using the processor's own timing reference or externally provided reference. In at least one embodiment, this high-speed DAC and/or the DAC 150 is a memory buffered high-speed DAC.

A first filter circuit 113 is coupled to the first PLLWG 110 and a first VCO 130. The first filter circuit 113 conditions the first analog tuning signal 112 and generates a first precise control voltage signal 125 and outputs this first precise control voltage signal 125 to the first VCO 130 for tuning the output frequency of the first VCO 130. In an analogous fashion, the second filter circuit 173 is coupled to the second PLLWG 170 and a second VCO 180. The second filter circuit 173 conditions the second analog tuning signal 172 and generates a second precise control voltage 179 and outputs this second precise control voltage 179 to the second VCO 180 for tuning the output frequency of the second VCO 180. In at least one embodiment, both the first PLLWG 110 and the second PLLWG 170 are Analog Devices ADF4169s used primarily in automotive Frequency-Modulated Continuous-Wave (FMCW) radar systems and test equipment. This integrated component is comprised of a low-noise digital Phase Frequency Detector (PFD) as the sensor for the phase-locked-loop function, charge pump for generating the first and second analog tuning signals 112/172, respectively, and a programmable reference divider with sigma-delta 25-bit fractional interpolator for defining RF channel center frequencies and ramp characteristics. These components also have latch enable and trigger input pins permitting the start of a ramp cycle and the advancement of ramp steps, a function discussed in more detail with the description of FIG. 2.

The PLLWGs 110/170 generate the first and second analog tuning signals 112/172 based on the first and second data program signals 107/108 and the first and second trigger command signals 105/175, respectively. The first and second analog tuning signals 112/172 are filtered, such as by the first filtering network 113 and the second filtering network 173, respectively. These filtered signals are subsequently used for tuning an output frequency of oscillators, such as the first VCO 130 and the second VCO 180, respectively. The VCOs 130/180 generate an RF signal having an output frequency and other electrical characteristics based on the tuning voltage presented at their inputs, such as the precise control voltages 125/179, respectively. The RF VCOs 130/180 are coupled to RF power splitters 140/190, respectively. This RF signal output frequency is used as the center frequency of a modulated transmission. The RF power splitters 140/190 are further coupled to the PLLWGs 110/170, respectively. The high-speed DAC 150 generates modulation signals that are sent to a upconverting QM mixer 160. The upconverting QM mixer 160 modulates the center frequency signal into a modulated waveform, such as a modulated output signal 165, containing the data provided by the high-speed DAC 150.

The MCU 100 also generates and outputs first and second data program signals 107/108 which are used to program the first and second PLLWGs 110/170, respectively, with ramp information and operating mode, as well as generating the first and second trigger command signals 105/175 which instruct the first and second PLLWGs 110/170, to generate and output a first analog tuning signal 112 and a second analog tuning signal 172, respectively, which is, in at least one embodiment, based on the ramp information and operating mode. The MCU 100 further generates a data command, such as a QM command 106, which instructs the QM DAC 150 to generate an in-phase modulation signal 156 and a quadrature modulation signal 157.

In at least one embodiment, the first filter circuit 113 and the second filter circuit 173 include resistive (not detailed separately in FIG. 1) and reactive elements (similarly not detailed separately). For example, the first filter circuit 113 includes a series resistor between the first analog tuning signal 112 and the first precise control voltage signal 125. Prior to this series resistor, there is a first capacitor to ground and a series combination of a second capacitor and a second resistor coupled to a first feedback pin on the first PLLWG 110. After the series resistor, there is a third capacitor to ground as well as a third resistor coupled to a second feedback pin on the first PLLWG 110. In at least one embodiment, the series resistor is 4.0 kOhms, the second resistor is 1.3 kOhms, and the third resistor is 1.3 kOhms. In at least one embodiment, the first capacitor to ground is 82 pF, the second capacitor is 560 pF, and the third capacitor to ground is 68 pF. In at least one embodiment, the second filter circuit 173 is identical to the first filter circuit 113.

In at least one other embodiment, other circuit configurations (not detailed separately) and values for the first filter circuit 113 and the second filter network 170 can be used, including fixed, variable, or digitally selectable capacitors between 0.05 pF to 10 g, fixed, variable, or digitally selectable resistors between 0.001 Ohm to 10 MOhm, and/or fixed, variable, or digitally selectable inductors between 0.1 nH to 100 µH. In at least one other embodiment, the first filter circuit 113 and the second filter network 170 can incorporate references to RF ground, analog ground, digital ground, or other voltage levels relative to a ground.

The first VCO 130 is powered by a first VCO voltage 131, a highly regulated and stable 3.00 V referenced to the analog ground. In a similar manner as with other tuning and oscillating components described herein, the voltage level of this reference voltage is critical to control, as variance and/or instability will transition into variance and/or instability of the output of the first VCO 130. In an analogous manner, the second VCO 180 is powered by a second VCO voltage 181, which is also a highly regulated and stable 3.00 V. In at least one embodiment, both of the VCOs 130/180 are Analog Devices HMC431LP4 monolithic microwave integrated circuits. The HMC431LP4 tunes from 5.5 to 6.1 GHz based on the input tuning voltage range of 0 to 10V and with moderate output power of a few dBm having low phase noise of −102 dBc/Hz. Such a device is typical for the communications industry for use in wireless infrastructure, industrial controls, test equipment, and military applications. The output frequency can change at a high slew rate (~1 GHz per microsecond) but only when presented with a strongly driven tuning signal. In at least one embodiment, the apparatus 50 lacks buffering amplifiers in the tuning signal paths of FIG. 1, which restricts the maximum speed of frequency change.

The first filtering circuit 113 outputs the precise tuning voltage signal 125 to the first VCO 130 to generate a first RF frequency signal 133. The first VCO 130 includes a first oscillator element 132 and a first VCO amplifier 134 that is coupled to the first oscillator element 132. The first oscillator element 132 receives the first precise control voltage signal 125 and outputs a first RF frequency signal 133. The first VCO amplifier 134 amplifies a first RF frequency signal 133 generated by the first oscillator element 132, and outputs this amplified signal to the remainder of the apparatus 50 as an amplified first channel frequency signal 135. In at least one embodiment, the amplified first channel frequency signal 135 ranges in frequency between 5727.02 MHz and 5821.32 MHz, with a power level varying between −0.5 dBm to +4.0 dBm. In other embodiment(s), the channel frequency and/or power level of the apparatus 50 can be significantly higher or lower, based on the characteristics of the particular VCO used.

Likewise, the second filtering circuit 173 outputs the precise tuning voltage 175 to the second VCO 180 to generate a second RF frequency 185. The second VCO 180 includes a second oscillator element 182 and a second VCO amplifier 184 that is coupled to the second oscillator element 182. The second oscillator element 182 receives the second precise control voltage 175 and outputs a second RF frequency 185. The second VCO amplifier 184 amplifies a second RF frequency signal 183 generated by the second oscillator element 182, and outputs this amplified signal to the remainder of the apparatus 50 as an amplified first channel frequency signal 185. In at least one embodiment, the amplified second channel frequency signal 185 ranges in frequency between 5727.02 MHz and 5821.32 MHz, with a power level varying between −0.5 dBm to +4.0 dBm. In other embodiment(s), the channel frequency and/or power level of the apparatus 50 can be significantly higher or lower, based on the characteristics of the particular VCO used.

The first VCO 130 is further coupled to a first power splitter 140 that receives the amplified first channel frequency signal 135. The first power splitter 140 transforms the amplified first channel frequency signal 135 into two RF signals having approximately half of the power of the amplified first channel frequency signal 135, a first pre-switch frequency signal 145 and a first feedback frequency signal 146. The first power splitter 140 outputs the first feedback frequency signal 146 to the first PLLWG 110 where the first feedback frequency signal 146 is measured by circuitry, e.g., a first PLD circuit 114, within the first PLLWG 110, to close its feedback loop from the first VCO 130 to the first PLLWG 110. The PLD circuit 114 detects if the output frequency of the first VCO 130 is matched to the target output frequency target within the accuracy of characteristics and timing resource precision of the PLD circuitry 114. In at least one embodiment, the apparatus 50 locks frequency (but not phase) in a time period of between 0.5 and 4 µsec for steps of 2.30 MHz. In other embodiment(s), the apparatus 50 can be achieve frequency lock in as little as 100 nsec, and in other embodiment(s) can readily achieve a range of lock times between 30 nsec and 30 µsec dependent on hardware, software, and operating conditions.

The second VCO 180 is further coupled to a second power splitter 190 that receives the amplified second channel frequency signal 185. In a similar manner to the first power splitter 140 discussed above, the second VCO 180 outputs the amplified second channel frequency signal 185 to a second power splitter 190 which transforms the amplified second channel frequency signal 185 into two RF signals, a second pre-switch frequency signal 195 and a second feedback frequency signal 196. The second power splitter 190 outputs the second feedback frequency 196 to the second PLLWG 170 and measured by circuitry, e.g., a second PLD 164, within the second PLLWG 170, to close its feedback loop from the second VCO 180 to the second PLLWG 170. In at least one embodiment, the timing characteristics of the amplified second pre-switch frequency signal 195 are at least similar to those of the amplified first pre-switch frequency signal 145 and the second power splitter 190 splits signals as the first power splitter 140, described above.

The first and second PLLWGs 110/170 can step through frequencies. An additional aspect of embodiment(s) described herein is that the first and second PLLWGs 110/170 are capable of not only PLL operation, but also of waveform generation. This specifically refers to the ability to pre-program the first and second PLLWGs 110/170 with a plurality of frequency targets in a specific order. In a typical application for PLLWG circuits in automotive FMCW radar, these pre-programmed frequency targets are arranged in a smooth triangle-shaped ramp or smooth sawtooth-shaped ramp. In a typical application for PLLWG circuits in test equipment, these pre-programmed frequency targets are arranged as a series of discrete steps that escalate monotonically from an initial lowest value to a final highest value. The increment between each step (e.g., how long each frequency step is maintained) is either a timed value or a triggered value, using an input signal to step from each frequency to the following frequency. Once the highest value is achieved, the typical PLLWG would be programmed to either stop transmission, restart the ramp (sawtooth type), or decrement in a similar fashion (triangle type).

In the example of FIG. 1, the MCU 100 programs target frequency steps into the first and second PLLWGs 110/170. These steps are adjusted during operation to the type of communications waveform required for each target. For a first target, the steps can be 2.30 MHz apart, with an initial lowest value at 5727.02 MHz and a final highest value at 5821.32 MHz. For a second target, the steps can be 2.0 MHz apart, with an initial lowest value at 5728.5 MHz and a final highest value of 5822.5 MHz. Many different step programs can be stored inside memory (not shown) accessed by the MCU 100 and programmed into each of the first and second PLLWGs 110/170 during operation to change the stepping patterns used during any one period of engagement with one or more communication targets as appropriate.

When the first PLLWG 110 reaches an inflection point of each triggered ramp of steps (e.g., the apex or nadir of each triangle ramp, or the apex of each sawtooth ramp), the first PLLWG 110 outputs a first ramp notification signal 116 back to the MCU 100 as digital feedback regarding channel selection. This digital feedback provides the MCU 100 with the information that the ramp is complete, and the first PLLWG 110 will be moving on to the next stage of its programmed ramp. This allows the MCU 100 to stay informed of channel center frequency status, so that a single error in output frequency due to an errant software command, bug, noise, electrical discontinuity, etc., will be detected and can be cleared within the period of time it takes for a single ramp to complete. Similarly, when the second PLLWG 170 reaches its inflection point of each of its triggered ramp of steps, the second PLLWG 170 outputs a second ramp notification signal 176 back to the MCU 100 as digital feedback. Note that the channel center frequencies detailed in each ramp's definition in the first PLLWG 110 and second PLLWG 170 can be completely different, with different start, stop, step size, and/or number of steps. These ramp definitions may also change in one or both of the first and second PLLWGs 110/170 during their operation as required.

In the example of FIG. 1, the MCU 100 generates each of the first and second trigger command signals 105/175 to not only begin the transmission and locking of the first step of a plurality of frequency target values, but to trigger the incrementing of movement to the next step. When used in this fashion, the example apparatus of FIG. 1 locks frequency and phase between steps of RF center frequencies in a time period of between 0.4 µsec and 0.7 µsec for the 2.3 and 2.0 MHz step patterns described above. Other component combinations can readily change frequencies as they step for this and/or other step patterns in time periods of between 10 nsec and 10 µsec, representing orders of magnitude improvement in frequency switching and lock times compared to typical communications systems not employing the presently disclosed embodiment(s).

The embodiment(s) of the apparatus 50 further provides an ability to advance frequency steps in a non-sequential manner, a characteristic that no other typical PLLWG circuit is able to do. In the example apparatus 50 of FIG. 1, the first and second trigger command signals 105/175 can be used in rapid succession, so that the frequency increments a plurality of steps instead of merely a single step. This succession may be performed up to the communication speed of the first and second PLLWGs 110/170, which in this example is 50 nsec for each step taken or skipped. This permits for capabilities that include being able to increment multiple steps to achieve a new RF channel center frequency close to a presently locked frequency in a very short time period and being able to skip various channels during each "pass" of a step pattern to provide both the appearance and effect of having a pseudo-random channel hopping sequence. The timing for implementing these capabilities is provided for in FIG. 2, discussed in detail below.

The MCU 100 generates both the first step command 105 and the second step command 175 that are both output to the two PLLWGs 110/170, respectively, to trigger the incrementing of movement to new frequencies. These step commands may be trigger-type commands for stepping through incremented ramps in a similar manner as described in FIG. 2. It is also contemplated that the example apparatus 50 of FIG. 1 can use frequency selection data as part of the first data program signals 107 and/or the second data program signals 108 to define a center frequency in a conventional manner than is provided for in the stepped ramp approach. The time it takes to lock onto a new frequency in this mode is much longer than with the other two modes. Because the apparatus 50 selects between two different frequency outputs using the RF switch 147, this additional time does not adversely affect operation of the apparatus 50.

The RF switch 147 receives the first pre-switch frequency signal 145 and the second pre-switch frequency signal 195, with only one of these two inputs being selected at a time to pass through to the output of the RF switch 147 as a switched center frequency signal 148. Thus, the RF switch 147 selectively outputs one of a first pre-switch frequency signal 145 and the second pre-switch frequency signal 195, the first pre-switch frequency signal 145 and the second pre-switch frequency signal 195 being based on the first analog tuning signal 112 and the second analog tuning signal 172, respectively. The other of these inputs to the RF switch 147 that is not selected to pass through to the output of the RF switch 147 is instead switched to a termination (not shown), which in the example of FIG. 1 is a broadband resistive load 158, e.g., 50 Ohm, coupled to ground and integrated with the RF switch 147 component itself. In at least one embodiment, the RF switch 147 is a Peregrine Semiconductor PE42420, a single-pole double throw switch with integrated 50 Ohm termination to ground and a switching time of 300 nsec. The RF switch 147 can separately select the first pre-switch frequency signal 145, the second pre-switch frequency signal 195, or neither input to connect to the output of the RF switch 147 as the switched center frequency signal 148.

In at least one other embodiment, other types of switching components and/or terminations may be used, such as a reflection open or short to ground. In some instances neither the first pre-switch frequency signal 145 nor the second pre-switch frequency signal 195 passed through to the output of the RF switch 147, instead both of these signals be switched to a termination, such as ground. In at least one other embodiment, more than two PLLWG with VCO pairs can be utilized, such that three or more RF center frequencies from different sources can be received by an RF switch, such as the RF switch 147, for switching and/or termination. In at least one embodiment, the RF switch 147 is the Skyworks SKY13411-374LF with a 35 nsec switching time, albeit with reduced isolation (only −15 dB at 5.8 GHz). Such a switch provides for fast center frequency switching, provided the RF signal leakage of the non-selected VCO is acceptable for the particular application.

The high-speed DAC 150 is further coupled to an in-phase signal filter 154 and a quadrature signal filter 155. The high-speed DAC 150 generates the in-phase raw data signal 152 and the quadrature raw data signal 153 which, in at least one embodiment, are not properly conditioned for use by the upconverting QM mixer 160 due to the wide spectral content of aliasing in digitally-derived content. The high-speed DAC 150 outputs the in-phase raw data signal 152 to a band-pass limiting in-phase signal filter 154 which conditions this signal into an in-phase modulator signal 156, the in-phase signal filter 154 outputting the in-phase modulator signal 156 to the upconverting QM mixer 160. The high-speed DAC 150 also outputs the quadrature raw data signal 153 to the quadrature signal filter 155 which conditions this signal into a quadrature modulator signal 157, the quadrature signal filter 155 outputting the quadrature modulator signal 157 to the upconverting QM mixer 160. Such conditioning in the analog domain includes filtering, translation from current to voltage, and, in other embodiment(s) described herein, but not shown in FIG. 1, buffering/amplification prior to outputting to the upconverting QM mixer 160.

The upconverting QM mixer 160 receives the switched center frequency signal 148 as a carrier wave for up-conversion with the data content of the in-phase modulator signal 156 and the quadrature modulator signal 157. The upconverting QM mixer 160 mixes both in-phase and quadrature content (IQ mixing), so the full range of frequency, phase, and amplitude modulation techniques are available to those skilled in the art. The upconverting QM mixer 160 outputs a modulated output signal 165 that is a waveform centered on the same frequency as the switched center frequency output 148, but containing frequency, phase, and amplitude content defined by the in-phase and quadrature data signals.

Figure 2:
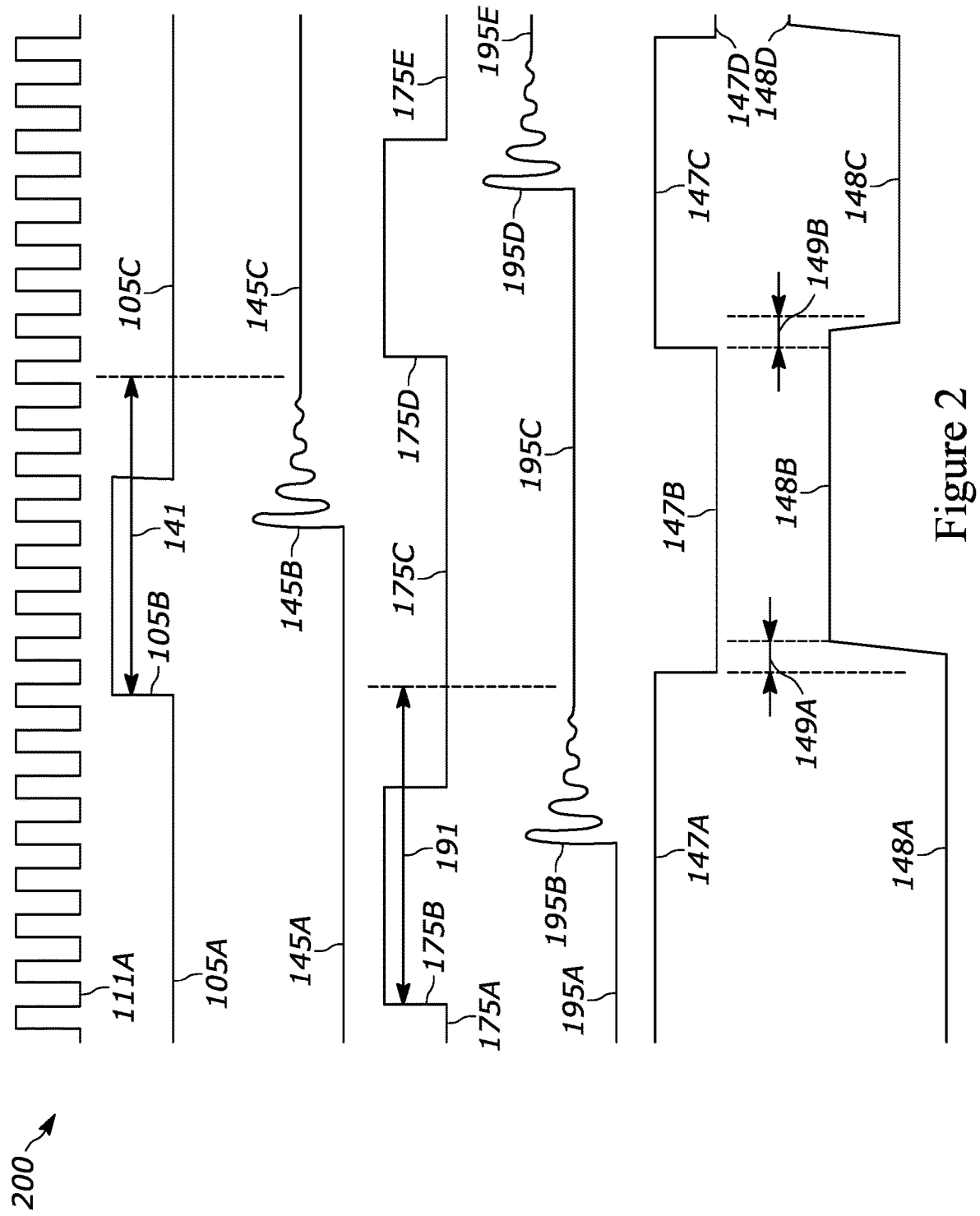
FIG. 2 illustrates example timing diagrams for the apparatus shown in FIG. 1, in accordance with at least one embodiment disclosed herein.

In a similar manner as the example embodiment(s) of FIG. 1 employing the first and second PLLWG clock signals 111/171, FIG. 2 shows a first and second PLLWGs clock signal 111A used for timing the first and second PLLWGs 110/170, respectively, the first and second PLLWG clock signal 111A being an example of the first and second PLLWG clock signals 111/171. The y-axis of this signal represents voltage, with in at least one embodiment a voltage "low" condition being approximately 0.1 V and a voltage "high" condition being approximately 1.7 V. The x-axis of this signal represents time, with in at least one embodiment a periodicity in the clock signal of 5 nsec in its low state followed by 4 nsec in its high state. In another embodiment(s), other physical and electrical characteristics of timing resources can be used, with other voltage levels typically used between −50 V and +50 V for relative signal conditions, and other periodicity between 0.01 nsec and 10 msec representing a wide range of clocks and timing circuitry used for various embodiments and systems utilizing that embodiment(s) by those skilled in the art of electronics design.

An example of the timing of the channel switching of the apparatus 50 of FIG. 1 is shown by a timing diagram 200 shown in FIG. 2. The signal traces shown in FIG. 1 are referred to as signals with different states in FIG. 2 using the same reference designator appended with A, B, C, etc. for clarity of following along with the description of each signal as it progresses through the timing diagram 200. The timing diagram 200 shown in FIG. 2 is based on the timing signal first PLLWG clock signal 111 which is output by the clock resource 102 to the first PLLWG 110, which is responsible for timing of the first PLLWG 110, and described above as being synchronous with the second PLLWG clock signal 171 that is output by the clock resource 102 to the second PLLWG 170, which is responsible for timing of the second PLLWG 170. For the purposes of simplification of discussion, both PLLWGs are shown to be triggered off of the same clock in FIG. 2.

The initial state of the timing diagram 200 shown in FIG. 2 is that the apparatus 50 is presently operating and transmitting, with several frequency steps anticipated throughout the period of time illustrated. The first step command 105 line is held in a first command initial low signal 105A and the first pre-switch frequency signal 145 is at an initial first pre-switch frequency signal 145A. Similarly, the second trigger command signal 175 line is held in an initial second trigger command low signal 175A and the second pre-switch frequency signal 195 is at an initial second pre-switch frequency signal 195A. A control line not discussed above in FIG. 1 is a switch initial state signal 147A for RF switch 147, which is in a logic high state. As a result of this logic high, the RF switch 147 selects the switched center frequency signal 148 to be an initial switched center frequency signal 148A, which in this example is the initial first pre-switch frequency signal 145A. Had the switch initial state signal 147A been in a logic low state at the start of the timing diagram 200 shown in FIG. 2, the initial switched center frequency signal 148A would have instead been the second pre-switch initial channel signal 195A.

While the apparatus 50 is transmitting the initial switched center frequency signal 148A, it is desired to next adjust the output to match a channel second pre-switch frequency signal 195C. While the circuit is still transmitting, the second trigger command low signal 175A is raised to a second trigger command high signal 175B. There is a short communications delay before the initial second pre-switch frequency signal 195A responds and begins a transition second pre-switch frequency signal 195B. After a total period of time noted as the second frequency delay 191, the output of the apparatus 50 settles on a channel second pre-switch frequency signal 195C. This local output is now ready to be selected to become the new main output of the apparatus 50. Meanwhile, even before the settling time has completed, a tertiary second trigger command low signal 175C is exerted to be ready for a future step.

One clock cycle after the channel second pre-switch frequency signal 195C has settled, the switch initial state signal 147A is pulled low by the MCU 100 to the switch secondary state signal 147B. The high-speed switch of the apparatus 50 is able to transition between the two inputs in a first switched frequency delay 149A, seen in the example shown to be about 10 nsec. A new switched center frequency signal 148B is now the channel second pre-switch frequency signal 195C, representing a rapid (and large) shift in frequency of the center channel on par with a single clock cycle of a digital synthesizer.

The example of FIG. 2 assumes very tight timing is required to hop between frequencies, so before the switch initial state signal 147A is even pulled low, and while the initial first pre-switch frequency signal 145A is output by the first power splitter 140, the command to change the frequency of the first PLLWG 110 is underway. The first command initial low signal 105A is pulled to a first command secondary high signal 105B, anticipating the delay in response from the rest of the apparatus 50. After this delay, the initial first pre-switch frequency signal 145A responds and begins a transition to the first pre-switch frequency signal 145B. After a total period of time noted as the first frequency delay 141, the output settles on a channel first pre-switch frequency signal 145C. As with the previous event, this local output from the first power splitter 140 is now ready to be selected. The first command tertiary low signal 105C is exerted to be ready for a future step (not shown).

One clock cycle after the channel first pre-switch frequency signal 145C has settled, the switch secondary state signal 147B is pulled high by the MCU 100 to the switch tertiary state signal 147C. As in the previous direction, the RF switch 147 transitions between its two inputs in a second switched frequency delay 149B, seen in the example to be about 8 nsec. A tertiary switched center frequency signal 148C is now the selected channel first pre-switch frequency signal 145C, again demonstrating extremely fast center channel movement as fast or faster than would be possible with typical serial communications-based approaches using digital synthesis that consumes significantly more power and having an integrated component cost.

Figure 3:
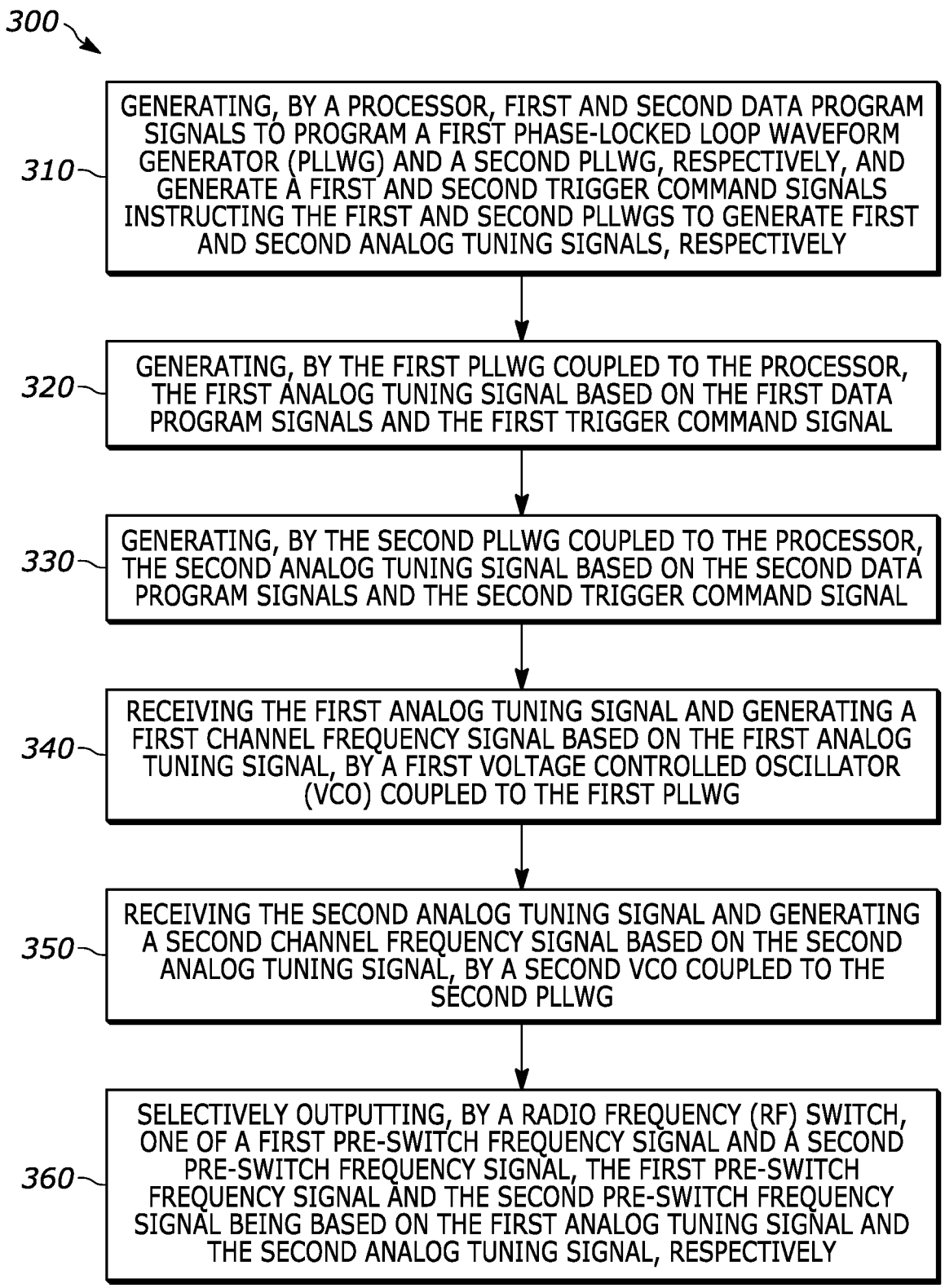
FIG. 3 illustrates an example method for selectively outputting a frequency signal, in accordance with at least one embodiment disclosed herein.

FIG. 3 illustrates a method 300 including a process 310 generating first and second data program signals 107/108 to program the first PLLWG 110 and a second PLLWG 170, respectively, and generating a first and second trigger command signals 105/175 instructing the first and second PLL-WGs 110/170 to generate the first and second analog tuning signals 112/172, respectively. In at least one embodiment, process 310 is performed by the MCU 100. Process 310 proceeds to process 320.

Process 320 includes generating the first analog tuning signal 112 based on the first data program signals 107 and the first trigger command signal 105. In at least one embodiment, this process 320 is performed by the first PLLWG 110. Process 320 proceeds to process 330.

Process 330 includes generating the second analog tuning signal 172 based on the second data program signals 108 and the second trigger command signal 175. In at least one embodiment, this process 330 is performed by the second PLLWG 170. Process 330 proceeds to process 340.

Process 340 includes receiving the first analog tuning signal 112 and generating a first channel frequency signal 135 based on the first analog tuning signal 112. In at least one embodiment, this process 340 is performed by the first VCO 130. Process 340 proceeds to process 350.

Process 350 includes receiving the second analog tuning signal 172 and generating the second channel frequency signal 185 based on the second analog tuning signal 172. In at least one embodiment, process 350 is performed by the second VCO 180. Process 350 proceeds to process 360.

Process 360 includes selectively outputting one of a first pre-switch frequency signal 145 and a second pre-switch frequency signal 195, the first pre-switch frequency signal 145 and the second pre-switch frequency signal 195 being based on the first analog tuning signal 112 and the second analog tuning signal 172, respectively. In at least one embodiment, process 360 is performed by the RF switch 147. The method 300 can further include any of the processes and any of the components of the apparatus 50 described above for FIG. 1.

The apparatus 50 is also able to advance frequency steps in a highly non-sequential and apparently unpredictable manner by any asynchronous agent. Not only may stepped trigger command signals be used in rapid succession, so that the frequency increments a plurality of steps, but each of the two PLLWGs 110/170 with their VCOs 130/180, respectively, can be stepping through completely different sections of the same ramp, or through two completely different ramps. This permits high variability to the options available for both the appearance and effect of a pseudo-random channel hopping sequence. Furthermore, because the frequency selection time between one stable frequency from one VCO (either VCO 130 or VCO 180) and a second stable frequency from another VCO (either VCO 130 or VCO 180) is limited primarily by the switching time, arbitrary channels may be selected and locked onto well in advance of when they are needed.

It other instantiations of the apparatus 50, the main pre-selected channels will not be progressed in a monotonic upwards or downwards fashion, and instead will vary in a pre-generated and/or pseudo-random fashion, with the speed of channel hopping limited to the circuit configuration of apparatus 50 developed by those skilled in the art. The order in which modulation will also vary in certain instantiations of the apparatus 50, so that rapid frequency movement and slower frequency movement may be interspersed. Error correction attempts to compensate for waveforms emulated in this manner disclosed herein will be more challenging for target receivers attempting to communicate in the presence of such signals generated by the apparatus 50.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. An apparatus, comprising:
a processor to generate first and second data program signals to program a first Phase-Locked Loop Waveform Generator (PLLWG) and a second PLLWG, respectively, and generate a first and second trigger command signals instructing the first and second PLL-WGs to generate first and second analog tuning signals, respectively;
the first PLLWG, coupled to the processor, to generate the first analog tuning signal based on the first data program signals and the first trigger command signal;

the second PLLWG, coupled to the processor, to generate the second analog tuning signal based on the second data program signals and the second trigger command signal;

a first Voltage Controlled Oscillator (VCO), coupled to the first PLLWG, to receive the first analog tuning signal and generate a first channel frequency signal based on the first analog tuning signal;

a second VCO, coupled to the second PLLWG, to receive the second analog tuning signal and generate a second channel frequency signal based on the second analog tuning signal; and a Radio Frequency (RF) switch to selectively output one of a first pre-switch frequency signal and a second pre-switch frequency signal, the first pre-switch frequency signal and the second pre-switch frequency signal being based on the first analog tuning signal and the second analog tuning signal, respectively.

2. The apparatus according to claim 1, further comprising:
a first Programmable Logic Device (PLD), within the first PLLWG, to close a first feedback loop from the first VCO to the first PLLWG; and
a second PLD, within the second PLLWG, to close a second feedback loop from the second VCO to the first PLLWG.

3. The apparatus according to claim 1, further comprising:
a first filtering circuit coupled to both the first PLLWG and the first VCO; and
a second filtering circuit coupled to both the second PLLWG and the second VCO;
wherein the first and second filtering circuits condition the first and second analog tuning signals, respectively.

4. The apparatus according to claim 1, further comprising:
a Digital-to-Analog Converter (DAC), wherein the processor further generates a data command which instructs the DAC to generate an in-phase modulation signal and a Quadrature Modulation (QM) signal; and
an upconverting QM mixer to receive the in-phase modulation signal, the QM signal, and one of the first pre-switch frequency signal and the second pre-switch frequency signal, and generate a modulated output signal based on the in-phase modulation signal, the quadrature modulation signal, and one of the first pre-switch frequency signal and the second pre-switch frequency signal.

5. The apparatus according to claim 4, further comprising:
an in-phase signal filter to condition an in-phase raw data signal from the DAC and generate an in-phase modulator signal; and
a quadrature signal filter to condition the QM signal and generate the quadrature modulation signal.

6. The apparatus according to claim 1, wherein the RF switch includes a broadband resistive load coupled to ground.

7. The apparatus according to claim 1, wherein each of the first and second PLLWGs are Analog Devices ADF4169s.

8. The apparatus according to claim 1, wherein the processor is one of an Intel Cyclone® 10GX, an NXP LPC43S50FET180E, and a System-On-a-Chip (SOC).

9. The apparatus according to claim 1, further comprising first and second Radio Frequency (RF) power splitters generating the first and second pre-switch frequency signals, respectively.

10. The apparatus according to claim 1, wherein each of the first and second VCOs includes an oscillator element and a VCO amplifier, the oscillator element to receive a control voltage and generate a radio frequency signal of a frequency determined by a voltage level of the control voltage and the VCO amplifier to amplify the radio frequency signal and output the amplified channel frequency signal.

11. A method, comprising:
generating, by a processor, first and second data program signals to program a first Phase-Locked Loop Waveform Generator (PLLWG) and a second PLLWG, respectively, and generate a first and second trigger command signals instructing the first and second PLLWGs to generate first and second analog tuning signals, respectively;
generating, by the first PLLWG coupled to the processor, the first analog tuning signal based on the first data program signals and the first trigger command signal;
generating, by the second PLLWG coupled to the processor, the second analog tuning signal based on the second data program signals and the second trigger command signal;
receiving the first analog tuning signal and generating a first channel frequency signal based on the first analog tuning signal, by a first Voltage Controlled Oscillator (VCO) coupled to the first PLLWG;
receiving the second analog tuning signal and generating a second channel frequency signal based on the second analog tuning signal, by a second VCO coupled to the second PLLWG; and
selectively outputting, by a Radio Frequency (RF) switch, one of a first pre-switch frequency signal and a second pre-switch frequency signal, the first pre-switch frequency signal and the second pre-switch frequency signal being based on the first analog tuning signal and the second analog tuning signal, respectively.

12. The method according to claim 11, further comprising:
closing, by a first Programmable Logic Device (PLD) within the first PLLWG, a first feedback loop from the first VCO to the first PLLWG; and
closing, by a second PLD within the second PLLWG, a second feedback loop from the second VCO to the first PLLWG.

13. The method according to claim 11, further comprising:
conditioning, by first and second filtering circuits, the first and second analog tuning signals, respectively, the first filtering circuit coupled to both the first PLLWG and the first VCO and the second filtering circuit coupled to both the second PLLWG and the second VCO.

14. The method according to claim 11, further comprising:
generating, by the processor, a data command which instructs a Digital-to-Analog Converter (DAC) to generate an in-phase modulation signal and a Quadrature Modulation (QM) signal;
receiving, by an upconverting QM mixer, the in-phase modulation signal, the QM signal, and one of the first pre-switch frequency signal and the second pre-switch frequency signal; and
generating, by the upconverting QM mixer, a modulated output signal based on the in-phase modulation signal, the quadrature modulation signal, and one of the first pre-switch frequency signal and the second pre-switch frequency signal.

15. The method according to claim 14, further comprising:
conditioning, by an in-phase signal filter, an in-phase raw data signal from the DAC to generate an in-phase modulator signal; and conditioning, by a quadrature signal filter, the QM signal to generate the quadrature modulation signal.

16. The method according to claim 11, wherein the RF switch includes a broadband resistive load coupled to ground.

17. The method according to claim 11, wherein each of the first and second PLLWGs are Analog Devices ADF4169s.

18. The method according to claim 11, wherein the processor is one of an Intel Cyclone® 10GX, an NXP LPC43S50FET180E, and a System-On-a-Chip (SOC).

19. The method according to claim 11, further comprising generating, by first and second Radio Frequency (RF) power splitters, the first and second pre-switch frequency signals, respectively.

20. The method according to claim 11, wherein each of the first and second VCOs includes an oscillator element and a VCO amplifier, the method further comprising:
    receiving, by the oscillator element, a control voltage;
    generating, by the oscillator element, a radio frequency signal of a frequency determined by a voltage level of the control voltage; and
    amplifying, by the VCO amplifier, the radio frequency signal and output the amplified channel frequency signal.

* * * * *